(12) United States Patent
Haartsen et al.

(10) Patent No.: US 8,140,016 B2
(45) Date of Patent: Mar. 20, 2012

(54) WIRELESS COMMUNICATION TERMINALS AND METHODS USING ACOUSTIC RANGING SYNCHRONIZED TO RF COMMUNICATION SIGNALS

(75) Inventors: Jacobus Haartsen, Hardenberg (NL); Henrik Sven Bengtsson, Lund (SE)

(73) Assignee: Sony Ericsson Mobile Communications AB (SE)

( * ) Notice: Subject to any disclaimer, the term of this patent is extended or adjusted under 35 U.S.C. 154(b) by 1042 days.

(21) Appl. No.: 12/047,926

(22) Filed: Mar. 13, 2008

(65) Prior Publication Data

US 2009/0233551 A1    Sep. 17, 2009

(51) Int. Cl.
*H04B 7/00* (2006.01)
(52) U.S. Cl. .................. 455/41.3; 455/41.2; 340/870.14
(58) Field of Classification Search .................. 455/41.2, 455/41.3; 340/870.14, 7.34; 375/139–145
See application file for complete search history.

(56) References Cited

U.S. PATENT DOCUMENTS

| | | | |
|---|---|---|---|
| 5,105,393 A | 4/1992 | Schorum | |
| 5,926,765 A | 7/1999 | Sasaki | |
| 6,374,179 B1 | 4/2002 | Smith et al. | |
| 2003/0008671 A1 | 1/2003 | Lundgren et al. | |
| 2003/0012168 A1* | 1/2003 | Elson et al. ................... | 370/338 |
| 2004/0033808 A1 | 2/2004 | Rorabaugh | |
| 2005/0181810 A1 | 8/2005 | Camp, Jr. et al. | |

FOREIGN PATENT DOCUMENTS

| | | |
|---|---|---|
| EP | 1 077 579 A1 | 2/2001 |
| GB | 2 380 080 A | 3/2003 |
| WO | WO 01/73710 A1 | 10/2001 |
| WO | WO 02/45273 A2 | 6/2002 |
| WO | 2006/120499 * | 11/2006 |
| WO | WO 2006/120499 A1 | 11/2006 |
| WO | WO 2008/065691 A1 | 6/2008 |

OTHER PUBLICATIONS

Notification of Transmittal of the International Search Report and the Written Opinion of the International Searching Authority, or the Declaration, International Search Report, Written Opinion of the International Searching Authority, PCT/IB2008/053729, Feb. 17, 2009.

* cited by examiner

*Primary Examiner* — Nay A Maung
*Assistant Examiner* — Angelica Perez
(74) *Attorney, Agent, or Firm* — Myers Bigel Sibley & Sajovec, P.A.

(57) ABSTRACT

Wireless communication terminals and methods are disclosed that determine acoustic ranging synchronized to RF communication signals. A communication terminal can include a RF transceiver, a microphone, and a controller. The controller synchronizes a clock in response to known timing characteristics of received RF communication signals. The controller determines an acoustic signal generation time relative to the RF communication signal synchronized clock at which the other communication terminal will generate an acoustic signal. The controller determines an acoustic signal receipt time relative to the RF signal synchronized clock when the acoustic signal from the other communication terminal is detected in the microphone signal. The controller further determines a propagation time of the acoustic signal from the other communication terminal to the microphone based on a difference between the acoustic signal generation time and the acoustic signal receipt time, and determines a range to the other communication terminal in response to the propagation time of the acoustic signal.

9 Claims, 6 Drawing Sheets

WIRELESS COMMUNICATION TERMINALS AND METHODS USING ACOUSTIC RANGING SYNCHRONIZED TO RF COMMUNICATION SIGNALS

BACKGROUND OF THE INVENTION

The present invention relates to the field of wireless communications in general and, more particularly, to determining the location of wireless communication terminals.

Many communication terminals, such as cellular communication terminals, personal digital assistants (PDAs), laptop computers, and the like, are now equipped with Global Positioning System (GPS) receivers to enable users to determine their location. GPS is a space-based radio triangulation system using a constellation of satellites in orbit around the Earth. A GPS receiver triangulates its position based on timing of radio signals it receives from various ones of the satellites and the known location of those satellites.

Determining the position of a GPS receiver typically requires the acquisition of a set of navigational parameters from the navigational data signals of four or more GPS satellites. The algorithms that are used to acquire GPS signals and determine position therefrom are typically complex and may require substantial processing throughput. The process of monitoring GPS signals can be significantly affected by environmental factors. For example, GPS signals that may be easily acquired in the open typically become harder or impossible to acquire when a receiver is within a building, a vehicle, and/or under foliage.

The process to acquire GPS signals can take several minutes depending upon how much acquisition information a GPS receiver has initially. In order to improve GPS receiver performance, techniques have been developed to provide GPS receivers with GPS acquisition assistance information, e.g., time and position estimates, satellite ephemeris and clock information, and a visible satellite list from a terrestrial cellular communication system, which can enable a GPS receiver to expedite its acquisition of GPS signals and associated position determination.

As can be appreciated, incorporating a GPS receiver and associated processing circuitry into a wireless terminal can greatly increase its cost and complexity. This cost and complexity further increases when the wireless terminal is further configured to receive and use GPS acquisition assistance information from a cellular communication system.

SUMMARY OF THE INVENTION

Various embodiments of the present invention provide wireless communication terminals that use acoustic-based ranging which is synchronized to RF communicating signals to determine the distance between them so that users can, for example, travel away from each other and then later find one another.

According to some embodiments, a wireless communication terminal includes a radio frequency (RF) transceiver, a microphone, and a controller. The RF transceiver is configured to communicate with another communication terminal across a wireless communication network that uses RF communication signals with known timing characteristics. The microphone generates a microphone signal that is indicative of incident acoustic signals. The controller is configured to synchronize a clock in response to the known timing characteristics of received RF communication signals. The controller is further configured to determine an acoustic signal generation time relative to the RF communication signal synchronized clock at which the other communication terminal will generate an acoustic signal. The controller determines an acoustic signal receipt time relative to the RF communication signal synchronized clock when the acoustic signal from the other communication terminal is detected in the microphone signal. The controller further determines a propagation time of the acoustic signal from the other communication terminal to the microphone based on a difference between the acoustic signal generation time and the acoustic signal receipt time, and determines a range to the other communication terminal in response to the propagation time of the acoustic signal.

In some further embodiments, the RF transceiver includes a Bluetooth transceiver that operates to establish a Bluetooth communication network with the other communication terminal. The controller is further configured to synchronize the clock in response to frame timing of the Bluetooth communication network.

In some further embodiments, the controller is further configured to transmit through the Bluetooth transceiver to the other communication terminal a message that identifies a Bluetooth signaling frame number that will serve as a known timing event that is to trigger the other communication terminal to begin generation of the acoustic signal, and is configured to determine the propagation time of the acoustic signal from the other communication terminal to the microphone based on a difference between timing of occurrence of the identified Bluetooth signaling frame number and the acoustic signal receipt time.

In some further embodiments, the controller is further configured to determine the acoustic signal generation time by decoding the acoustic signal to identify information encoded therein that identifies when the acoustic signal was generated.

In some further embodiments, the RF transceiver includes a cellular transceiver that communicates with a cellular base station. The controller is further configured to synchronize the clock in response to RF communication signals received from the cellular base station.

In some further embodiments, the controller is further configured to transmit through the cellular base station to the other communication terminal a message that identifies a known cellular timing event that is to trigger the other communication terminal to begin generation of the acoustic signal, and is configured to determine the propagation time of the acoustic signal from the other communication terminal to the microphone based on a difference between timing of occurrence of the known cellular timing event and the acoustic signal receipt time.

In some further embodiments, the RF transceiver includes a Universal Mobile Telecommunications System (UMTS) transceiver that communicates with a UMTS base station. The controller is further configured to transmit via the UMTS base station to the other communication terminal a message that identifies a UMTS signaling frame number that is to trigger the other communication terminal to begin generation of the acoustic signal, and is configured to determine the propagation time of the acoustic signal from the other communication terminal to the microphone based on a difference between timing of occurrence of the identified UMTS signaling frame number and the acoustic signal receipt time.

In some further embodiments, the controller is further configured to use a short message service (SMS) protocol to transmit the message that identifies a known cellular timing event that is to trigger the other communication terminal to begin generation of the acoustic signal.

In some further embodiments, the controller is further configured to enable carrying out of the ranging determination to the other communication terminal in response to receiving, via SMS protocol, an acknowledgment message from the other communication terminal indicating acknowledgment of the other communication terminal's plan to generate the acoustic signal responsive to occurrence of the identified UMTS signaling frame number, and to disable carrying out of the ranging determination in response to not receiving the acknowledgment message.

In some further embodiments, the controller is further configured to enable detection of the acoustic signal from the other communication terminal only during a time window between about the acoustic signal generation time and a threshold time corresponding to about a maximum range at which the acoustic signal from the other communication terminal is expected to be able to be sensed by the microphone.

In some further embodiments, the controller is further configured to identify the acoustic signal in the microphone signal in response to the acoustic signal having a known acoustic pattern, and to determine the acoustic signal receipt time in response to identifying occurrence of the acoustic signal in the microphone signal.

In some further embodiments, the controller is further configured to identify the acoustic signal in the microphone signal in response to the acoustic signal having a fundamental frequency that corresponds to a known frequency within a known ultrasonic frequency range, and to determine the acoustic signal receipt time in response to identifying occurrence of the acoustic signal in the microphone signal.

In some further embodiments, the controller is further configured to receive, from the other communication terminal, an electronic map and identification of a location of the other communication terminal within the electronic map, and to determine its location within the electronic map in response to the identified location of the other communication terminal and the determined acoustic range to the other communication terminal.

In some further embodiments, the controller is further configured to receive from the other communication terminal an absolute geographic location of the other communication terminal, and to determine its absolute geographic location in response to the identified absolute geographic location of the other communication terminal and the determined acoustic range to the other communication terminal.

In some further embodiments, the communication terminal further includes a sound generation device. The controller is further configured to receive a commanded acoustic signal generation time from the other communication terminal, and to cause the sound generation device to generate an acoustic signal in response the commanded acoustic signal generation time occurring relative to the RF signal synchronized clock.

In some further embodiments, the controller is further configured to carry out the acoustic range determination to the other communication terminal at three or more spaced-apart locations, to measure distances between the same three or more spaced-apart locations where the acoustic range determinations were carried out, and to determine a direction to the other communication terminal in response to triangulation of the acoustic ranges and the measured distances between the three or more spaced-apart locations.

Some other embodiments are direct to a communication terminal that includes a wireless RF transceiver, a sound generation device, and a controller. The RF transceiver is configured to communicate with another communication terminal using RF communication signals having known timing characteristics. The controller is configured to synchronize a clock in response to the known timing characteristics of received RF communication signals, to enable an acoustic ranging mode in response to identifying an acoustic ranging command received from the other communication terminal via the RF transceiver that indicates that the other communication terminal is ready to assist with acoustic ranging, to determine an acoustic signal generation time relative to the RF communication signal synchronized clock, and to cause the sound generation device to generate an acoustic signal in response to occurrence of the identified acoustic signal generation time and the acoustic ranging mode being enabled.

In some further embodiments, the controller is further configured to determine the acoustic signal generation time from information within the received acoustic ranging command.

In some further embodiments, the controller is further configured to receive an acoustic signal receipt time signal from the other communication terminal via the RF transceiver that indicates when the acoustic signal was received by the other communication terminal relative to the synchronized clock, to determine a propagation time of the acoustic signal to the other communication terminal based on the acoustic signal receipt time signal, and to determine an acoustic range to the other communication terminal in response to the propagation time of the acoustic signal.

In some further embodiments, the controller is further configured to generate the acoustic signal with a frequency-dependent chirp sequence that covers a defined bandwidth providing a sufficiently low power density that is substantially inaudible to humans.

Some other embodiments are directed to a communication terminal that includes a wireless RF transceiver, a sound generation device, an electronic map repository, and a controller. The RF transceiver is configured to communicate with another communication terminal using RF communication signals having known timing characteristics. The electronic map repository includes map data and information that identifies a location of the communication terminal within the electronic map. The controller is configured to transmit the electronic map and the information identifying its location within the electronic map to the other communication terminal, to synchronize a clock in response to the known timing characteristics of received RF communication signals, to enable an acoustic ranging mode in response to identifying an acoustic ranging command received from the other communication terminal via the RF transceiver that indicates that the other communication terminal is ready to assist with acoustic ranging, to determine an acoustic signal generation time relative to the RF communication signal synchronized clock, and to cause the sound generation device to generate an acoustic signal in response to occurrence of the identified acoustic signal generation time and the acoustic ranging mode being enabled.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
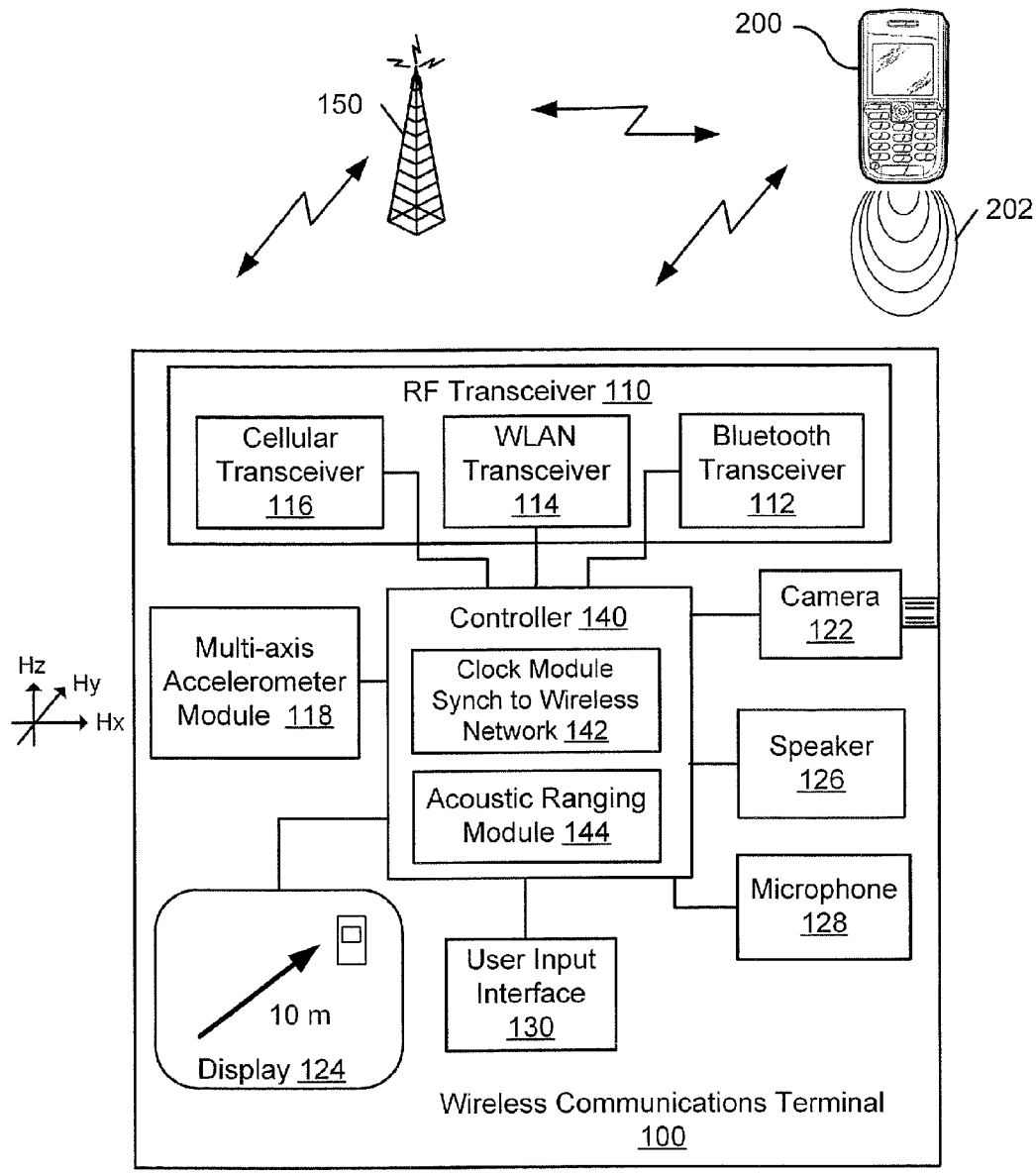
FIG. 1 illustrates a wireless communication terminal that is configured to determine range to another wireless communication terminal responsive to propagation time of sound transmitted from the other communication terminal at a time synchronized to a communication network clock, and that can further determine direction thereto in accordance with some embodiments of the present invention.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

As used herein, a "wireless communication terminal" or, abbreviated, "terminal" includes, but is not limited to, any electronic device that is configured to transmit/receive communication signals with a long range wireless interface such as, for example, a cellular interface, via a short range wireless interface such as, for example, a Bluetooth wireless interface, a wireless local area network (WLAN) interface such as IEEE 801.11a-g, and/or via another radio frequency (RF) interface. Example terminals include, but are not limited to, cellular phones, PDAs, and mobile computers that are configured to communicate with other terminal via a cellular network and/or via a Bluetooth interface, WLAN interface, and/or another RF interface.

In accordance with various embodiments of the present invention, two or more terminals are configured to use acoustic-based ranging which is synchronized to RF signals to determine the distance between them so that users can, for example, travel away from each other and then later find one another. FIG. 1 illustrates a terminal 100 that is configured to determine range to another terminal 200 responsive to propagation time of an acoustic signal 202 that is transmitted from the other terminal 200 at a time which is synchronized to a communication network clock in accordance with some embodiments of the present invention. The terminal 100 may be further configured to determine a direction to the other terminal 200.

The terminal 100 can include a wireless RF transceiver 110, a microphone 128, and a controller 140. The transceiver 110 is configured to receive RF signals having known timing characteristics and to communicate with the other terminal 200. The microphone 128 generates a microphone signal that is indicative of incident acoustic signals. The controller 140 is configured to synchronize a clock that is internal to the terminal 100 in response to the known timing characteristics of received RF signals. The controller 140 coordinates with the other terminal 200 to determine an acoustic signal generation time, which is relative to the RF signal synchronized clock and at which time the other terminal 200 will generate an acoustic signal. The controller 140 determines an acoustic signal receipt time relative to the RF signal synchronized clock when the acoustic signal from the other terminal 200 is detected in the microphone signal. The controller 140 further determines a propagation time of the acoustic signal from the other terminal 200 to the microphone 128 based on a difference between the acoustic signal generation time and the acoustic signal receipt time, and determines a range to the other terminal 200 based upon the propagation time and velocity of the acoustic signal. The controller 140 may be configured to display the determined range on a display device 124.

The range can be determined by multiplying the velocity of the acoustic signal through air times the determined propagation time of the acoustic signal. The accuracy of the determined range depends upon the accuracy of the determined propagation time, and which depends upon the terminal 100 knowing when the terminal 200 generated the acoustic signal and when the audible signal was received. More particularly, the measurements of when the terminal 200 generated the acoustic signal and when the acoustic signal was received by the terminal 100 can be synchronized to RF signals received by both terminals 100 and 200 from a common communication network which functions as a common reference clock. Because the velocity of the acoustic signal through air is many orders of magnitude slower then the velocity of a RF signal transmitted along the same path (e.g., 300 m/s for the acoustic signal versus $3 \times 10^8$ m/s for the RF signal), ranging performed using acoustic signals as opposed to RF signals can have substantially higher accuracy at a same margin of error between reference clocks used by the terminals 100 and 200.

For example, the terminals 100 and 200 may be synchronized to operate with a common reference clock timing margin of error of 30 μs when an acoustic signal is being used to determine range with an accuracy of 1 cm between them while they are within audible range. In sharp contrast, the terminals 100 and 200 should be synchronized to operate with a common reference clock timing margin of error of about 30 ps when a RF signal is being used to determine range between them with the same range accuracy. Consequently, the range may be determined using an acoustic signal with much higher accuracy while also allowing a higher margin of error in the common reference clock timing than may be obtainable when using RF signal ranging.

In some other embodiments, the other terminal 200 is configured to determine the acoustic signal receipt time which it then transmits to the terminal 100. For example, the terminal 100 can generate the acoustic signal at an acoustic signal generation time relative to a common reference clock that is synchronized to a RF signal. The other terminal 200 determines the acoustic signal receipt time relative to the common reference clock. The other terminal 200 transmits the acoustic signal receipt time to the terminal 100, which the terminal 100 uses to determine the propagation time and the acoustic range to the terminal 200.

In the exemplary embodiment of FIG. 1, the transceiver 110 can include a Bluetooth transceiver 112, a WLAN transceiver 114 (e.g., compliant with one or more of the IEEE 801.11a-g standards), and/or a cellular transceiver 116. The transceiver 110 typically includes both a transmitter and a receiver to allow bi-directional communications, but the present invention is not limited to such transceivers and, as used herein, a "transceiver" may include only a receiver pursuant to various embodiments described herein.

The Bluetooth transceiver 112 and the WLAN transceiver 114 are configured to operate to establish a Bluetooth communication network and a WLAN communication network, respectively, with the other terminal 200. The cellular transceiver 116 is configured to operate to establish a cellular communication network through one or more cellular transceiver base stations 150.

The controller 140 is configured to synchronize a clock, which is internal to the terminal 100, in response to RF signals received from the Bluetooth communication network, the WLAN communication network, and/or the cellular communication network. The synchronized clock may include a clock circuit module 142 which generates a periodic clock signal which may be internal to the controller 140, as shown in FIG. 1, and/or located elsewhere within the terminal 100. The synchronized clock may alternatively be configured as a circuit which is triggered by occurrence of a defined RF signal (e.g., computer program instructions executed in response to receipt of a defined RF signal), such as will be described below with regard to occurrence of a defined Bluetooth signaling frame number or a defined cellular (e.g., Universal Mobile Telecommunications System) signaling frame number.

The cellular transceiver 116 can be configured to communicate using one or more cellular communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS).

The terminal 100 can thereby communicate with the other terminal 200 over short ranges, which may be less than about 100 meters when using a WLAN communication link through the WLAN transceiver 114 or less than about 10 meters when using a Bluetooth communication link through the Bluetooth transceiver 112. The first terminal can further communicate with the second terminal 120 over much greater ranges using the cellular transceiver 116 communicating through one or more cellular transceiver base stations 150.

The terminal 100 includes an acoustic ranging module 144, such as within the controller 140, that is configured with algorithms and processing capabilities to coordinate with the other terminal 200 an acoustic signal generation time relative to the RF signal synchronized clock at which the other terminal 200 will generate an acoustic signal, and is configured to determine the propagation time of the acoustic signal and determine therefrom the range to the other terminal 200. The controller 140 may communicate an acoustic ranging command to the other terminal 200 which identifies the acoustic signal generation time, or may receive the acoustic ranging command therefrom.

The terminal 100 may further include an accelerometer module 118, a speaker 126, a camera 122, and a user input interface 130 (e.g., keypad, keyboard, touch interface). It is to be understood that although the exemplary terminal 100 has been illustrated with various separately defined elements for ease of illustration and discussion, the invention is not limited thereto. Instead, various functionality described herein in separate functional elements may be combined within a single functional element and, vice versa, functionally described herein in single functional elements can be carried out by a plurality of separate functional elements.

As will be described further below with regard to FIGS. 7 and 8, the controller 140 can be configured to determine direction to the other terminal 200 by triangulating acoustic ranges to the terminal 200 that are determined at three or more different locations of the terminal 100. The controller 140 may display the determined direction and range to the other terminal 200, and may communicate the determined range and/or direction to the other terminal 200 through the RF transceiver 110 and associated communication network.

Figure 2A:
FIGS. 2A and 2B illustrate communication terminals that display direction and acoustically determined range to one or more communication terminals in accordance with some embodiments of the present invention.
Figure 2B:
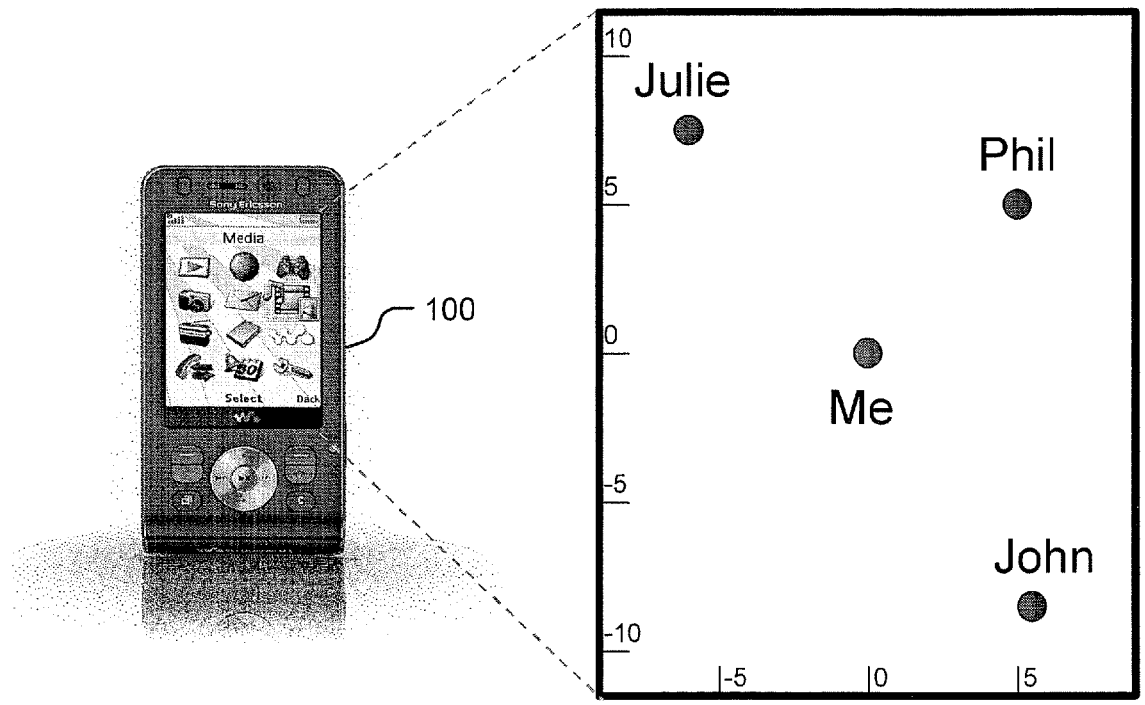

FIG. 2A shows an exemplary embodiment of the terminal 100 that is displaying a range (e.g., 10 m) that was determined based on propagation time of an acoustic signal generated by the other terminal 200 and that is displaying a direction that was determined based on triangulation of received RF signals from the other terminal 200. FIG. 2B shows another exemplary embodiment of the terminal 100 that displays a map in which a plurality of other terminals are displayed with associated labels (i.e., Julie, Phil, and John), and which are positioned on the map so as to convey to user of the terminal 100 (i.e., labeled "Me") the respective direction and distance from the terminal 100 to each of the other terminals.

The terminal 200 may be configured in a similar manner to the terminal 100, or may have additional or less functionality. Accordingly, the terminal 200 may include an RF transceiver (e.g., 110), a sound generation device (e.g., 126), and a controller (e.g., 140). The controller can be configured to control the sound generation device to generate the acoustic signal 202 having an acoustic pattern and/or having a fundamental frequency that is known to the controller 140 of the terminal 100. The sound generation device may, for example, include a speakerphone speaker, an ear speaker, and/or a piezoelectric device. The controller is configured to synchronize a clock internal to the terminal 200 in response to the known timing characteristics of received RF communication signals having known timing characteristics, and to identify an acoustic ranging command received from the terminal 100 via the RF transceiver or to transmit the acoustic ranging command to the terminal 100. The terminal 200 identifies within the acoustic ranging command an acoustic signal generation time that is defined relative to the RF signal synchronized clock (e.g., the Bluetooth/cellular frame number). The terminal 200 is further configured to cause the sound generation device to generate an acoustic signal in response to the commanded acoustic signal generation time occurring relative to the RF signal synchronized clock (e.g., sensing Bluetooth/cellular signals indicating occurrence of the defined frame number).

The controller 140 of the terminal 100 can be configured to identify occurrence of the acoustic signal 202 in the microphone signal in response to the acoustic signal having an acoustic pattern that is known to the controller 140, and to selectively determine the acoustic signal receipt timing in response to identifying the acoustic signal in the microphone signal having the known acoustic pattern. Alternatively or additionally, the controller 140 can be configured to identify the acoustic signal 202 in the microphone signal in response to the acoustic signal having a fundamental frequency that corresponds to a known frequency that is above about 18 kHz, and which may be within an ultrasonic frequency range. The controller 140 can trigger determination of the acoustic signal receipt timing in response to identifying occurrence of the acoustic signal in the microphone signal having the known fundamental frequency.

In some embodiments, the terminal 200 can be configured to generate the acoustic signal 202 and the controller 140 of the terminal 100 to be configured to identify occurrence of the acoustic signal 202 having a defined encoding pattern of acoustic pulse spacing, amplitude variation, and/or frequency variation. For example, the terminals 200 and 100 can be configured to generate and recognize an acoustic signal having a frequency-dependent chirp sequence that covers a defined bandwidth, which may correspond to the entire acoustic bandwidth of the terminals 100 and 200. The frequency-dependent chirp sequence can be configured to cause a sufficiently low power density so that the resulting acoustic signal is at least substantially or completely inaudible to humans. Alternatively, the frequency-dependent chirp sequence can be configured so that the power level of frequency components of the acoustic signal that are sensitive to human hearing are generated at lower power levels than frequency components that are outside a range that is sensitive to human hearing.

Accordingly, the acoustic signal 202 may be encoded so as to improve accuracy of the detection by the controller 140 in environments having background noise. Using an acoustic signal 202 that is above 18 kHz or elsewhere within the ultrasonic frequency range allows the acoustic ranging to be carried out outside the audible range of human users and, thereby, avoid related annoyance to users.

In some embodiments, the acoustic signal generation time may be encoded within the acoustic signal that is generated by terminal 200. For example, the controller 140 may be configured to decode the received acoustic signal to determine at what time it was transmitted, such as by determining what Bluetooth/cellular frame number triggered its generation. Accordingly, it is not necessary for the terminals 100 and 200 to coordinate a time at which the terminal 200 will generate the acoustic signal, since the time of its generation may be encoded within the acoustic signal itself.

Figure 3:
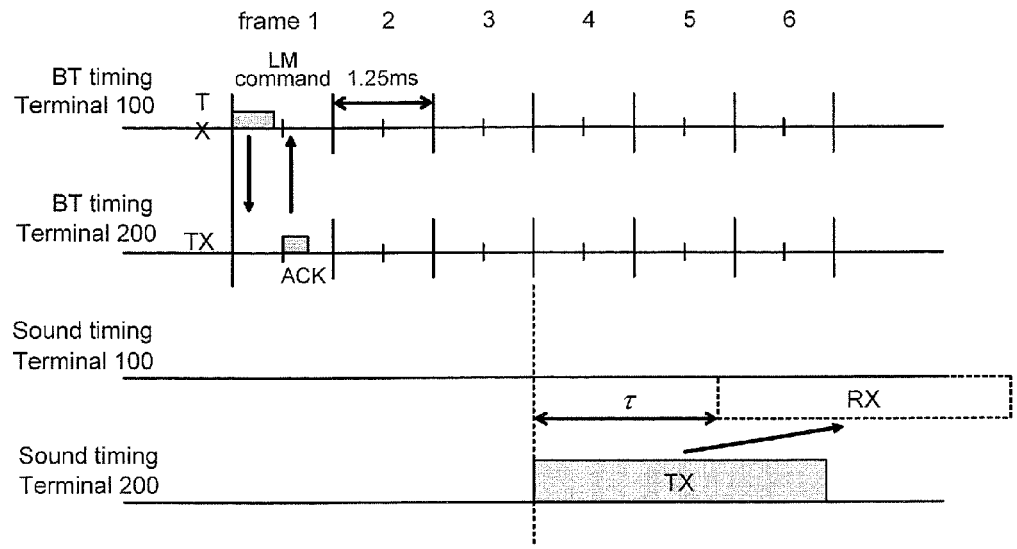
FIG. 3 illustrates a timing diagram for the relative timing between Bluetooth radio signals and generation of acoustic signals used for determining ranging in accordance with some embodiments of the present invention.
Figure 4:
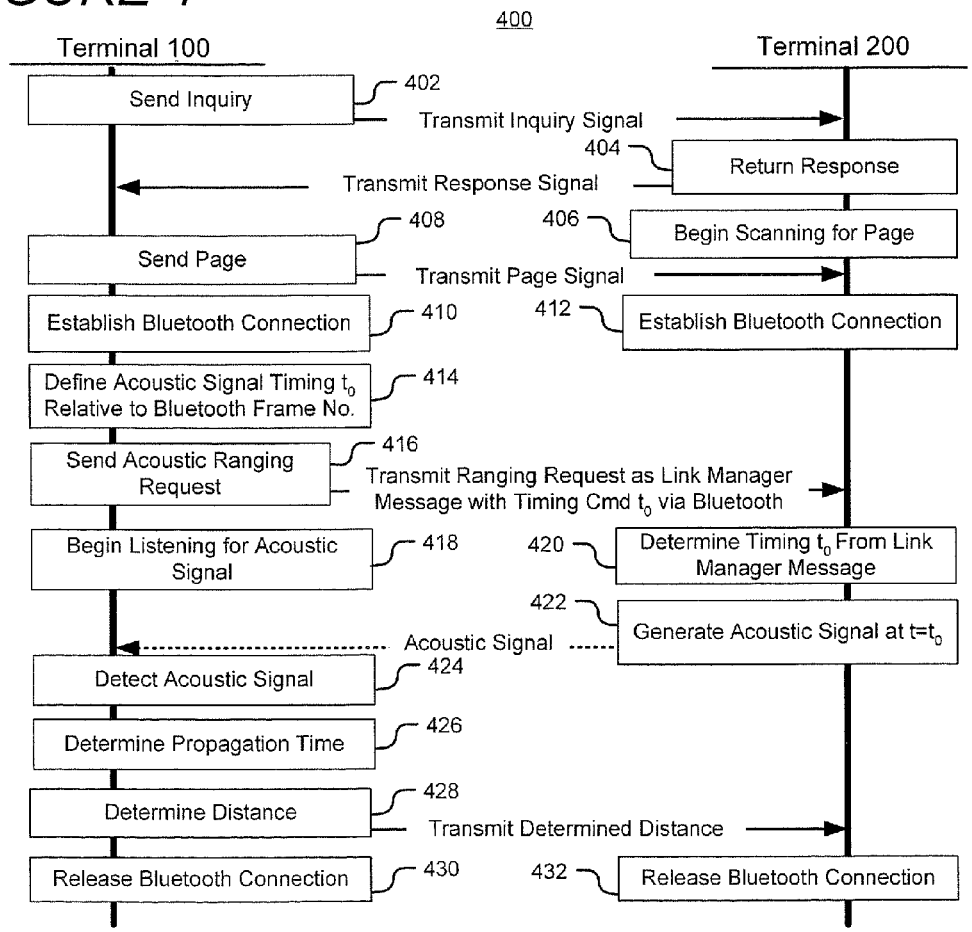
FIG. 4 is a flowchart and data flow diagram showing exemplary operations of a pair of communication terminals that coordinate through Bluetooth radio signals to perform acoustic ranging in accordance with some embodiments of the invention.

FIG. 3 illustrates an exemplary timing diagram for the relative timing between Bluetooth (BT) radio signals and generation of acoustic signals used for determining ranging in accordance with some embodiments of the invention. FIG. 4 is a flowchart and data flow diagram showing exemplary operations (400) that can be carried out by the terminals 100 and 200 to coordinate through Bluetooth radio signals to perform acoustic ranging in accordance with some embodiments of the invention.

Referring to FIGS. 1 and 4, the controller 140 transmits an acoustic ranging command to the other terminal 200. Generally, the acoustic ranging command can be transmitted via the Bluetooth transceiver 112 as a link manager (LM) Bluetooth message that identifies a Bluetooth signaling frame number that will serve as a known timing event that is to trigger the other terminal 200 to begin generation of the acoustic signal 202. The controller 140 determines the propagation time of the acoustic signal 202 from the other terminal 200 to the microphone 128 based on a difference between timing of occurrence of the identified Bluetooth signaling frame number and the acoustic signal receipt time.

More particularly, the terminal 100 initially establishes a Bluetooth network connection with the other terminal 200 by transmitting an inquiry signal (402) to the terminal 200. The terminal 200 transmits a response signal (404) to the terminal 100 and then begins scanning (406) for a page message. The terminal 100 transmits a page signal (408) to the terminal 200, and the terminals 100 and 200 complete other signaling (410 and 412) to establish a Bluetooth network connection therebetween.

The terminal 100 defines (414) an acoustic signal generation time ($t_0$) that identifies a Bluetooth frame number that will serve as a known timing event that is to trigger the other terminal 200 to generate the acoustic signal. The terminal 100 transmits (416) a LM Bluetooth message that includes information which identifies a Bluetooth signaling frame number that will serve as a common reference timing event that is to trigger the other terminal 200 to begin generation of the acoustic signal 202. Accordingly, the terminals 100 and 200 both use the acoustic signal generation time ($t_0$) to become synchronized to a common reference clock that is provided by the Bluetooth signals, such as by Bluetooth signals that indicates occurrence of a particular numbered Bluetooth frame.

The terminal 200 may transmit an acknowledgment message back to the terminal 100. The terminal 100 may enable carrying out of the subsequent ranging determination to the terminal 200 in response to receiving the acknowledgment message from the terminal 200, and may disable carrying out of the ranging determination to the terminal 200 in response to not receiving an acknowledgment message within a threshold time of transmitting the acoustic ranging request (416).

The terminal 100 begins listening (418) for the acoustic signal generated by the terminal 200, by monitoring the microphone signal to identify occurrence of the acoustic signal therein. The terminal 200 determines (420) the acoustic signal generation time ($t_o$) from the received LM message. The terminal 200 generates (422) an acoustic signal from a speaker or other sound generation device upon occurrence of the acoustic signal generation time ($t_o$), which can correspond to receiving Bluetooth signaling that indicates occurrence of a defined Bluetooth signaling frame number.

The terminal 100 detects (424) occurrence of the acoustic signal in the microphone signal having a known pattern of acoustic pulse spacing, amplitude variation, and/or frequency variation and triggers recording of the acoustic signal receipt time.

The terminal 100 determines (426) the propagation time of the acoustic signal from the other terminal 200 to the microphone 128 based on a difference between the acoustic signal generation time ($t_o$) and the acoustic signal receipt time. The terminal 100 determines (428) the range (distance) to the terminal 200 by multiplying the velocity of the acoustic signal (e.g., 300 m/s) times the determined propagation time of the acoustic signal. The terminal 100 can display the determined range on the display device 124 and may transmit the determined range to the other terminal 200 for display to a user.

The terminals 100 and 200 may release (430 and 432) the Bluetooth network connection upon completion of the determination of the range therebetween, or may repeat at least some of the operations 414 through 428 to dynamically update the ranging as one or both of the terminals 100 and 200 are moved relative to one another.

By way of further example, referring to FIG. 3, the terminal 100 transmits a Bluetooth LM command to terminal 200 at the beginning of Bluetooth frame number 1. The LM command identifies an acoustic signal generation time ($t_o$) that corresponds to the beginning of Bluetooth frame number 4. The terminal 200 responds to the LM command by transmitting an acknowledgment back to terminal 100. In response to the terminal 200 sensing Bluetooth signaling that indicates occurrence of Bluetooth frame number 4, the terminal 200 begins to generate the acoustic signal. The terminal 100 receives the acoustic signal after a propagation time τ. The terminal 100 determines the propagation time τ based on an elapsed time from sensing Bluetooth signaling that indicated occurrence of Bluetooth frame number 4 and receipt of the acoustic signal. The terminal 100 determines the range to the terminal 200 based on multiplying the velocity of the acoustic signal (e.g., 300 m/s) times the determined propagation time τ.

Figure 5:
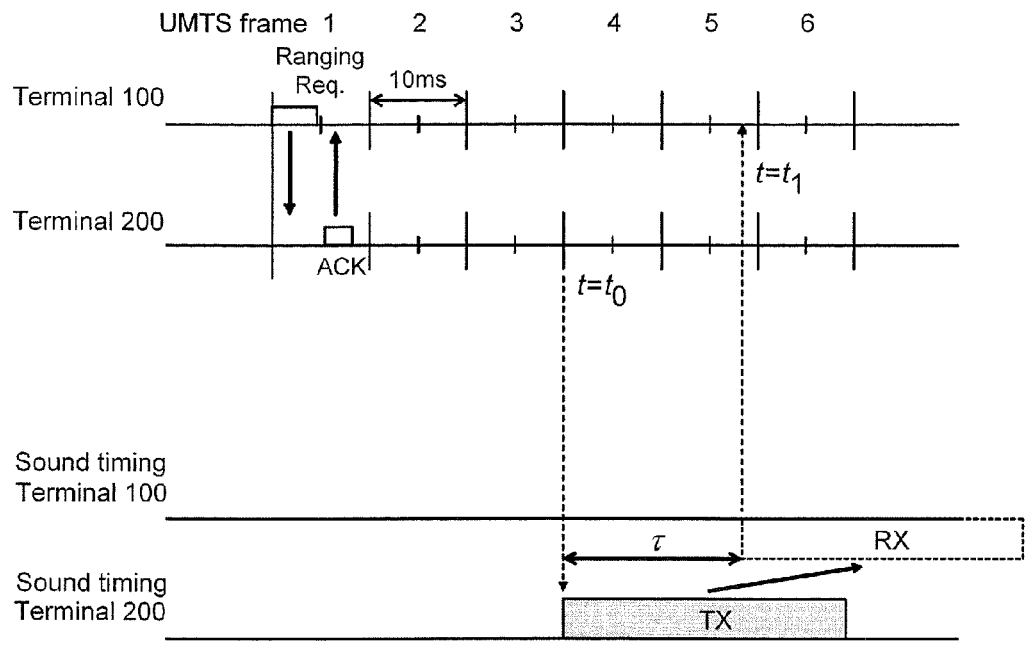
FIG. 5 illustrates a timing diagram for the relative timing between Universal Mobile Telecommunications System radio signals and the generation of acoustic signals used for determining ranging in accordance with some embodiments of the present invention.
Figure 6:
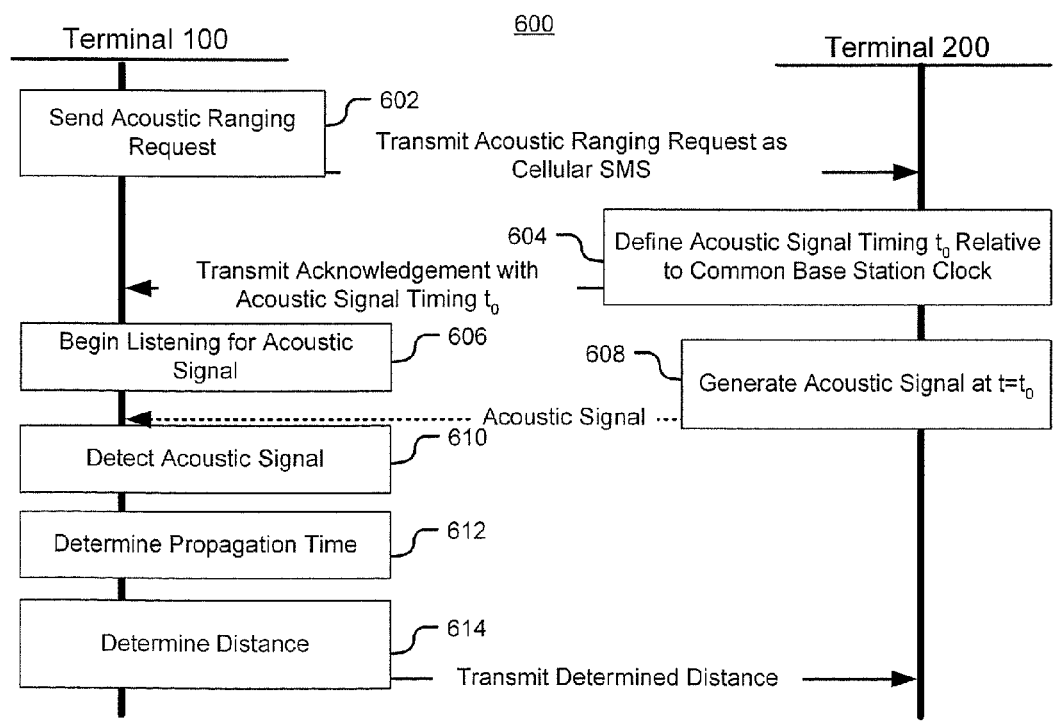
FIG. 6 is a flowchart and data flow diagram showing exemplary operations of a pair of communication terminals that coordinate through Universal Mobile Telecommunications System radio signals to perform acoustic ranging in accordance with some embodiments of the invention.

Instead of using the Bluetooth RF wireless system to establish a common timing reference for terminals 100 and 200, different RF wireless systems can be used, such as UMTS. FIG. 5 illustrates an exemplary timing diagram for the relative timing between UMTS radio signals, or more generally cellular radio signals, and generation of acoustic signals used for determining ranging in accordance with some embodiments of the invention. FIG. 6 is a flowchart and data flow diagram showing exemplary operations (600) that can be carried out by the terminals 100 and 200 to coordinate through UMTS radio signals to perform acoustic ranging in accordance with some embodiments of the invention.

Referring to FIGS. 1 and 6, the controller 140 transmits an acoustic ranging command to the other terminal 200. Generally, the controller 140 can transmit a SMS protocol message (or other cellular message) via the cellular transceiver 116 that identifies a UMTS signaling frame number that will serve as a known timing event that is to trigger the other terminal 200 to begin generation of the acoustic signal 202. The controller 140 determines the propagation time of the acoustic signal 202 from the other terminal 200 to the microphone 128 based on a difference between timing of occurrence of the identified UMTS signaling frame number and the acoustic signal receipt time.

More particularly, the terminal 100 transmits (602) an acoustic ranging request to the other terminal 200 through the cellular transceiver 116 and a UMTS cellular communication network. The other terminal 200 responds by defining (604) an acoustic signal generation time ($t_o$) that identifies a UMTS frame number that will serve as a known timing event that will trigger the terminal 200 to generate the acoustic signal, and transmits (604) the acoustic signal generation time ($t_o$) within an acknowledgment message to the terminal 100, such as via a SMS protocol message.

Accordingly, the terminals 100 and 200 both use the acoustic signal generation time ($t_o$) to become synchronized to a common reference clock that is provided by the UMTS communication signals from the base station 150 (e.g., synchronized to trigger action in response to occurrence of an identified numbered UMTS frame). Because the terminals 100 and 200 are proximately located to one another so that the terminal 100 is within hearing range of the terminal 200, the terminals 100 and 200 can both be within the service area of the same base station (e.g., 150) and, therefore, may be synchronized to the same cellular signals (e.g., to the same cellular control channel signals provided by the common base station).

The terminal 100 may enable carrying out of the subsequent ranging determination to the terminal 200 in response to receiving the acknowledgment message from the terminal 200, and may disable carrying out of the ranging determination to the terminal 200 in response to not receiving an acknowledgment message within a threshold time of sending the acoustic ranging request (602).

The controller 140 of terminal 100 begins listening (606) for the acoustic signal generated by the terminal 200, by monitoring the microphone signal to identify occurrence of an acoustic signal therein. The terminal 200 generates (608) the acoustic signal from a speaker or other sound generation device upon occurrence of the acoustic signal generation time ($t_o$), which can correspond to receiving UMTS communication signals that indicate occurrence of the UMTS signaling frame number identified by the acknowledgment message (604).

The controller 140 of terminal 100 may enable detection of (i.e., begin listening for) the acoustic signal from the other terminal 200 only during a timing window that begins from the about the earliest expected timing of the acoustic signal generation time and extends to a maximum time corresponding to a maximum range at which the acoustic signal from the other communication terminal is expected to be able to be sensed by the microphone 128. By selectively looking for occurrence of the acoustic signal only within the timing window, the terminal 100 may improve the accuracy with which it identifies occurrence of the acoustic signal in environments having background noise, such as by not erroneously misidentifying noise occurring outside of the timing window as the acoustic signal from the other terminal 200.

The terminal 100 detects (610) occurrence of the acoustic signal in the microphone signal and records the acoustic signal receipt time in response to a defined pattern of acoustic pulse spacing, amplitude variation, and/or frequency variation in the microphone signal. The terminal 100 determines (612) the propagation time of the acoustic signal from the other terminal 200 to the microphone 128 based on a difference between the acoustic signal generation time ($t_0$) and the acoustic signal receipt time. The terminal 100 determines (614) the range to the terminal 200 by multiplying the velocity (e.g., 300 m/s) times the determined propagation time of the acoustic signal. The terminal 100 may display the determined range on the display device 124 and may transmit the determined range to the other terminal 200 for display to a user.

By way of further example, referring to FIG. 5, the terminal 100 transmits an acoustic ranging request via a cellular message, such as a SMS protocol message, to terminal 200 at the beginning of UMTS frame number 1. The terminal 200 responds to the acoustic ranging request message by transmitting an acknowledgment message that identifies an acoustic signal generation time ($t_0$) that corresponds to the beginning of UMTS frame number 4. In response to the terminal 200 sensing UMTS communication signals that indicate occurrence of UMTS frame number 4, the terminal 200 begins to generate the acoustic signal. The terminal 100 receives the acoustic signal after a propagation time $\tau$. The terminal 100 determines the propagation time $\tau$ based on an elapsed time from occurrence of UMTS frame number 4 and receipt of the acoustic signal. The terminal 100 determines the range to the terminal 200 based on multiplying the velocity (e.g., 300 m/s) times the determined propagation time $\tau$ of the acoustic signal.

Although exemplary apparatus and methods have been described with regard to FIGS. 3-6 for how the common reference clock used for acoustic ranging can be synchronized to Bluetooth and/or UMTS signals, the invention is not limited thereto. The common reference clock may additionally or alternatively be synchronized to defined WLAN signals and/or other RF communication signals.

Figure 7:
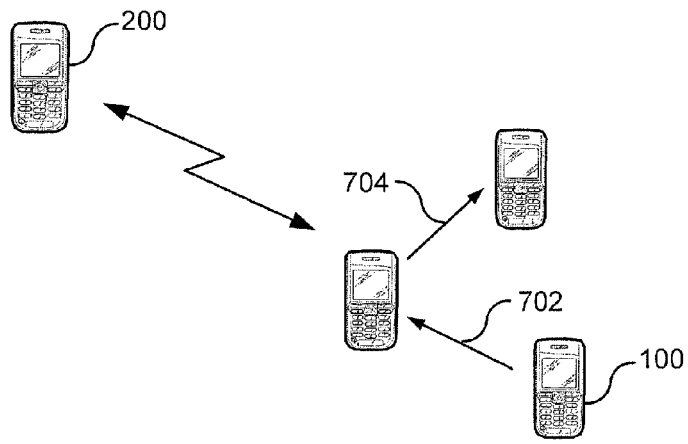
FIG. 7 illustrates a communication terminal that is moved between three or more different locations where it measures acoustic range to another communication terminal so as to determine direction to the other communication terminal.

FIG. 7 illustrates movement of the terminal 100 between three spaced apart locations, along paths 702 and 704. At each of the locations, the terminal 100 determines its distance to terminal 200 using the acoustic signal measurements as described above. Based on the three distances, triangulation is carried out to determine the position of terminal 200 relative to terminal 100. FIG. 8 is a flowchart that illustrates associated operations carried out by the terminal 100 to determine the direction to the other terminal 200.

Figure 8:
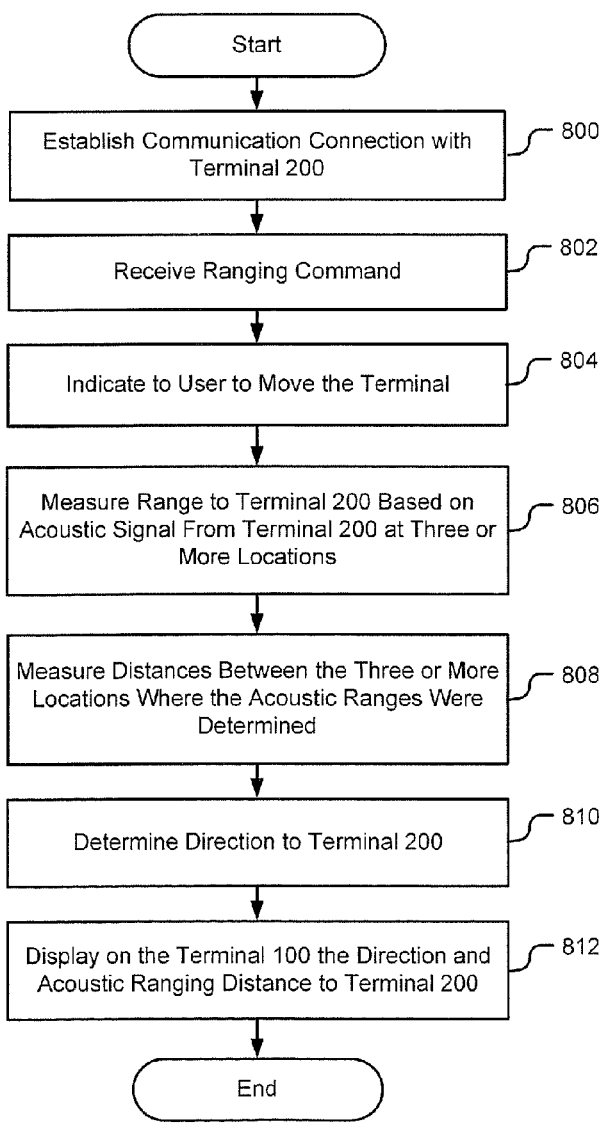
FIG. 8 is a flowchart that illustrates operations within a communication terminal for determining direction to another communication terminal using acoustic ranging at three or more different locations of the communication terminal.

Referring to FIGS. 1, 7, and 8, after the terminals 100 and 200 establish (800) a communication network therebetween (e.g., Bluetooth and/or WLAN), a user can command (802) the controller 140 of terminal 100 to performing ranging using the acoustic signals received from the other terminal 200. The controller 140 can display an instruction (804) to a user to move the terminal 100 to three or more spaced apart locations. The controller 140 measures (806) the range to the other terminal 200 in response to the received acoustic signal at each of the spaced apart locations as described above.

The controller 140 can also measure (808) the distance between each of the locations where the acoustic ranges to the other terminal 200 were measured. For example, the accelerometer module 118 can include a plurality of accelerometer sensors that are arranged to measure acceleration and rotation along a plurality of orthogonal axes, such as along the illustrated horizontal axes Hx and Hy and the vertical axis Hz. The controller 140 can integrate acceleration data from the accelerometer module 118 over time (e.g., double integration over time) to determine the distance and direction that the terminal 100 has moved, along paths 704 and 704, between the three spaced apart locations where the terminal 100 measured acoustic ranges to the other terminal 200.

The controller 140 can determine (810) the direction to the other terminal 200 by triangulating the acoustically-determined ranges to the terminal 200 and the acceleration-determined distances between the same three or more different locations where each of the acoustically-determined ranges were determined.

The controller 140 may cause the acoustic range and direction to the other terminal 200 to be displayed (812) on the display device 124. The controller 140 may communicate the determined range and/or direction to the other terminal 200 through the RF transceiver 110 and associated communication network.

In some further embodiments, the terminal 100 can determine its absolute geographic location by determining its acoustic range and direction from the other terminal 200 and by knowing the absolute location of the other terminal 200. For example, the terminal 200 can include a GPS receiver that can determine its geographic position based on GPS signals received from a GPS satellite constellation, and/or it may be informed of its absolute location by other processes that may include communication network assisted positioning. The terminal 200 can transmit its absolute location (e.g., latitude and longitude geographic coordinates) to the terminal 100, and the terminal 100 can then determine its absolute location using acoustic ranging to determine its absolute location relative to that of the terminal 200.

In some further embodiments, the terminal 200 can include an electronic map repository (e.g., memory device containing map data) that defines objects and relative positioning between objects, such as by defining walls that are configured to provide corridors and rooms within a building. The terminal 200 can further include information that identifies its fixed location relative to the electronic map, such by identifying where it is located within a building floor plan. The terminal 200 may operate as a beacon that transmits the electronic map and its fixed location therein to the terminal 100. The terminal 100 can then determine its position on the electronic map in response to the known location of the terminal 200 and in response to an acoustically determined range from the terminal 200.

Figure 9:
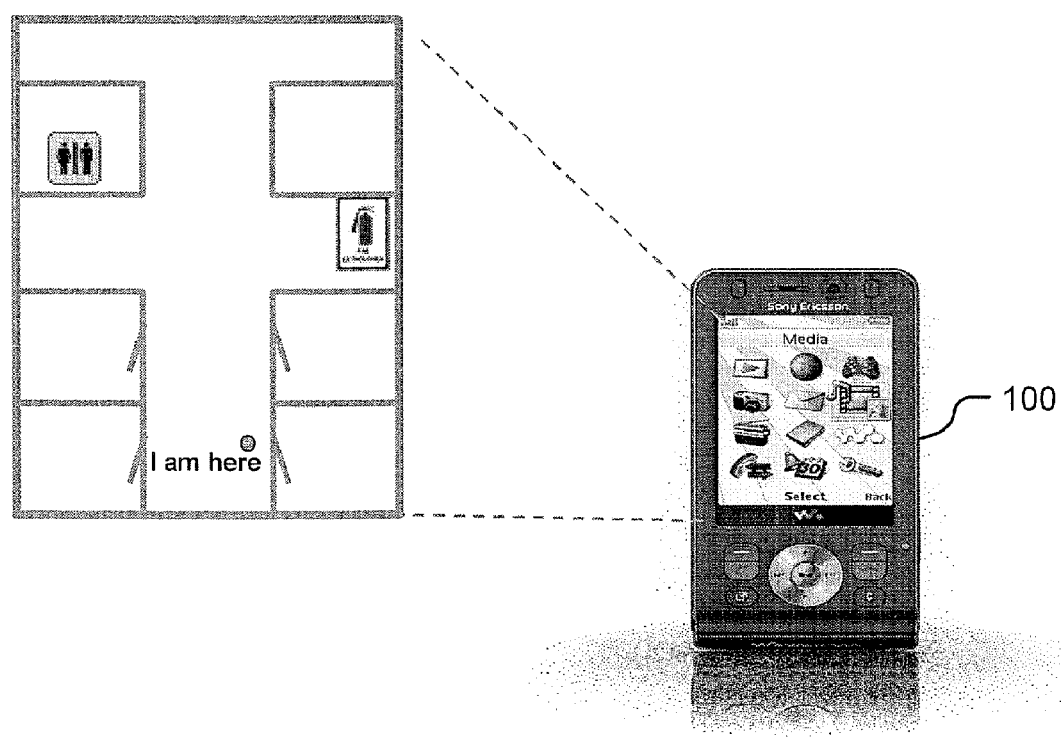
FIG. 9 illustrates a communication terminal that displays a map showing its location within a building in accordance with some embodiments of the present invention.

For example, referring to FIG. 9, the terminal 100 is displaying a portion of an exemplary building floor plan with an indication thereon of where it is located (i.e., "I am here"). The terminal 200 may, for example, be positioned at the corner of the restroom block and be programmed to contain an electronic map of at least a portion of the building floor plan and to have information that identifies where it is located within the building floor plan. The terminal 200 can transmit the electronic map and its location thereon to the terminal 100. The terminals 100 and 200 can operate as described above to determine the acoustic range and direction therebetween. The terminal 100 can then determine its position within the building floor plan using the determined acoustic range and direction to the other terminal 200 and the known position of the other terminal 200, and can display at least a portion of the building floor plan and its position thereon, such as that shown in FIG. 9.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A communication terminal comprising:
   a radio frequency (RF) transceiver that comprises a Bluetooth transceiver that operates to establish a Bluetooth communication network with another communication terminal across a wireless communication network that uses RF communication signals with known timing characteristics;

a microphone that generates a microphone signal that is indicative of incident acoustic signals;

a controller that is configured to synchronize a clock in response to frame timing of the Bluetooth communication network, to transmit through the Bluetooth transceiver to the other communication terminal a message that identifies a Bluetooth signaling frame number that will serve as a known timing event that is to trigger the other communication terminal to begin generation of an acoustic signal, and is configured to determine a propagation time of the acoustic signal from the other communication terminal to the microphone based on a difference between timing of occurrence of the identified Bluetooth signaling frame number and the acoustic signal receipt time, and to determine an acoustic range to the other communication terminal in response to the propagation time of the acoustic signal.

2. The communication terminal of claim 1, wherein:
the controller is further configured to determine the acoustic signal generation time by decoding the acoustic signal to identify information encoded therein that identifies when the acoustic signal was generated.

3. The communication terminal of claim 1, wherein:
the controller is further configured to enable detection of the acoustic signal from the other communication terminal only during a time window between about the acoustic signal generation time and a threshold time corresponding to about a maximum range at which the acoustic signal from the other communication terminal is expected to be able to be sensed by the microphone.

4. A communication terminal comprising:
a radio frequency (RF) transceiver comprises a cellular transceiver that is configured to communicate with another communication terminal through a cellular base station across a wireless communication network that uses RF communication signals with known timing characteristics;

a microphone that generates a microphone signal that is indicative of incident acoustic signals;

a controller that is configured to synchronize a clock in response to RF communication signals received from the cellular base station, to transmit through the cellular base station to the other communication terminal a message that identifies a signaling frame number that is to trigger the other communication terminal to begin generation of the acoustic signal, to determine the propagation time of the acoustic signal from the other communication terminal to the microphone based on a difference between timing of occurrence of the signaling frame number and the acoustic signal receipt time, and to determine an acoustic range to the other communication terminal in response to the propagation time of the acoustic signal.

5. The communication terminal of claim 4, wherein:
the RF transceiver comprises a Universal Mobile Telecommunications System (UMTS) transceiver that communicates with a UMTS base station;
the controller is further configured to transmit via the UMTS base station to the other communication terminal a message that identifies a UMTS signaling frame number that is to trigger the other communication terminal to begin generation of the acoustic signal, and is configured to determine the propagation time of the acoustic signal from the other communication terminal to the microphone based on a difference between timing of occurrence of the identified UMTS signaling frame number and the acoustic signal receipt time.

6. The communication terminal of claim 4, wherein:
the controller is further configured to use a short message service (SMS) protocol to transmit the message that identifies a known cellular timing event that is to trigger the other communication terminal to begin generation of the acoustic signal.

7. A communication terminal comprising:
a radio frequency (RF) transceiver that is configured to communicate with another communication terminal across a wireless communication network that uses RF communication signals with known timing characteristics;

a sound generation device; and a controller that is configured to synchronize a clock in response to the known timing characteristics of received RF communication signals, to enable an acoustic ranging mode in response to identifying an acoustic ranging command received from the other communication terminal via the RF transceiver that indicates that the other communication terminal is ready to assist with acoustic ranging, to determine an acoustic signal generation time relative to the RF communication signal synchronized clock, and to cause the sound generation device to generate an acoustic signal in response to occurrence of the identified acoustic signal generation time and the acoustic ranging mode being enabled, wherein the controller is further configured to determine the acoustic signal generation time from information within the received acoustic ranging command, and wherein the controller is further configured to receive an acoustic signal receipt time signal from the other communication terminal via the RF transceiver that indicates when the acoustic signal was received by the other communication terminal relative to the synchronized clock, to determine a propagation time of the acoustic signal to the other communication terminal based on the acoustic signal receipt time signal, and to determine an acoustic range to the other communication terminal in response to the propagation time of the acoustic signal.

8. A communication terminal comprising:
a Bluetooth transceiver that is configured to communicate with another communication terminal across a Bluetooth communication network that uses RF communication signals with known timing characteristics;

a sound generation device; and a controller that is configured to synchronize a clock in response to frame timing of the Bluetooth communication network, to enable an acoustic ranging mode in response to receiving a message from the other communication terminal via the RF transceiver that indicates that the other communication terminal is ready to assist with acoustic ranging and identifies a Bluetooth signaling frame number that will trigger the communication terminal to begin generation of an acoustic signal, and to cause the sound generation device to generate the acoustic signal in response to occurrence of the Bluetooth signaling frame number and the acoustic ranging mode being enabled.

9. The communication terminal of claim 8, wherein the controller is further configured to generate the acoustic signal with a frequency-dependent chirp sequence that covers a defined bandwidth providing a sufficiently low power density that is substantially inaudible to humans.

* * * * *